FIG. 1

INVENTOR.
OTTO B. VETTER
BY
Kegan and Kegan
ATTORNEYS

Oct. 24, 1950  O. B. VETTER  2,527,282
CALCULATING LINKAGE
Filed Feb. 21, 1948  5 Sheets-Sheet 2

INVENTOR.
OTTO B. VETTER
BY
Kegan and Kegan
ATTORNEYS

Oct. 24, 1950  O. B. VETTER  2,527,282
CALCULATING LINKAGE
Filed Feb. 21, 1948  5 Sheets-Sheet 3

INVENTOR.
OTTO B. VETTER
BY
Kegan and Kegan
ATTORNEYS

FIG. 10

INVENTOR.
OTTO B. VETTER
BY
Kegan and Kegan
ATTORNEYS

Oct. 24, 1950     O. B. VETTER     2,527,282
CALCULATING LINKAGE Filed Feb. 21, 1948     5 Sheets-Sheet 5

INVENTOR.
OTTO B. VETTER
BY
Kegan and Kegan
ATTORNEYS

Patented Oct. 24, 1950

2,527,282

UNITED STATES PATENT OFFICE 2,527,282

CALCULATING LINKAGE

Otto B. Vetter, McKeesport, Pa., assignor to Hagan Corporation, Pittsburgh, Pa., a corporation of Pennsylvania Application February 21, 1948, Serial No. 10,109

8 Claims. (Cl. 235—61)

The instant invention relates generally to measuring instruments. More particularly, the instant invention relates to mechanism which totalizes or summates two or more independent measurements and either exhibits and/or records a deflection equivalent thereto or else imparts this deflection to a suitable control system.

By the term "totalize" or "summate," as used in both the specification and the appended claims, is meant both the mathematical sum of or difference between two or more measurements. It will thus be apparent to those skilled in the art that the field of application of my invention is distinct from that of mechanical couplings of the conventional compensation type, since these latter mechanisms multiply one measurement for the effects of another measurement, as is the case where fluid flow is compensated for the effects of temperature, pressure, and/or specific gravity. Furthermore, in conventional compensation devices, the magnitude of the principal measurement is usually quite large compared to the factor or factors for which it is being compensated. While my invention may be used to compensate a principal measurement for a corrective factor which bears an additive or subtractive relation to the principal measurement and which is relatively small in proportion thereto, it is equally capable of totalizing two or more measurements where each is approximately of the same order of magnitude.

The principal object of my invention, therefore, is to provide mechanism which is capable of accurately totalizing two or more measurements.

Another object of the present invention is to provide totalizing mechanism in which a deflection equivalent to the total of two or more measurements may be recorded; used to actuate appropriate control means; or both.

Another object is to provide a totalizing mechanism which is accurate, simple and rugged in structure, easy to calibrate and to adjust, and inexpensive to manufacture.

The manner in which the foregoing objects of my invention are achieved may be best ascertained by referring to a typical application thereof. By way of example, my invention may be used to add together two fluid flows each of which is measured by an indicating-type measuring element. By means of appropriate mechanism two cranks rotating about two shafts, respectively, are displaced in accordance with the magnitudes of the two flows. Two connecting rods interconnect these two cranks and are in turn connected, at a common axis of rotation, to a rocker arm. The rocker arm drives a third crank which actuates appropriate exhibiting and recording linkage. Kinematically, as one of the cranks is deflected, the other crank acts as a fixed link so that the third crank is constrained to deflect proportionally to the movement imparted to the first crank. Similarly, when the other crank is deflected, the first crank acts as a fixed link so that the third crank follows the movement imparted to the said other crank. Consequently, the total deflection of the third crank is proportional to the sum of the motions imparted to the first two cranks by the two measuring elements. The manner in which this form of my invention may be altered or modified to adapt it to further useful applications will become apparent as this exposition proceeds.

In order that my invention may be more fully disclosed, reference is had to the accompanying drawings which illustrate several forms of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restrictive to the particular details recited in the specification or shown in the drawings.

In the drawings.

Like reference characters designate like parts in the drawings and in the detailed description which follows.

Figure 1:
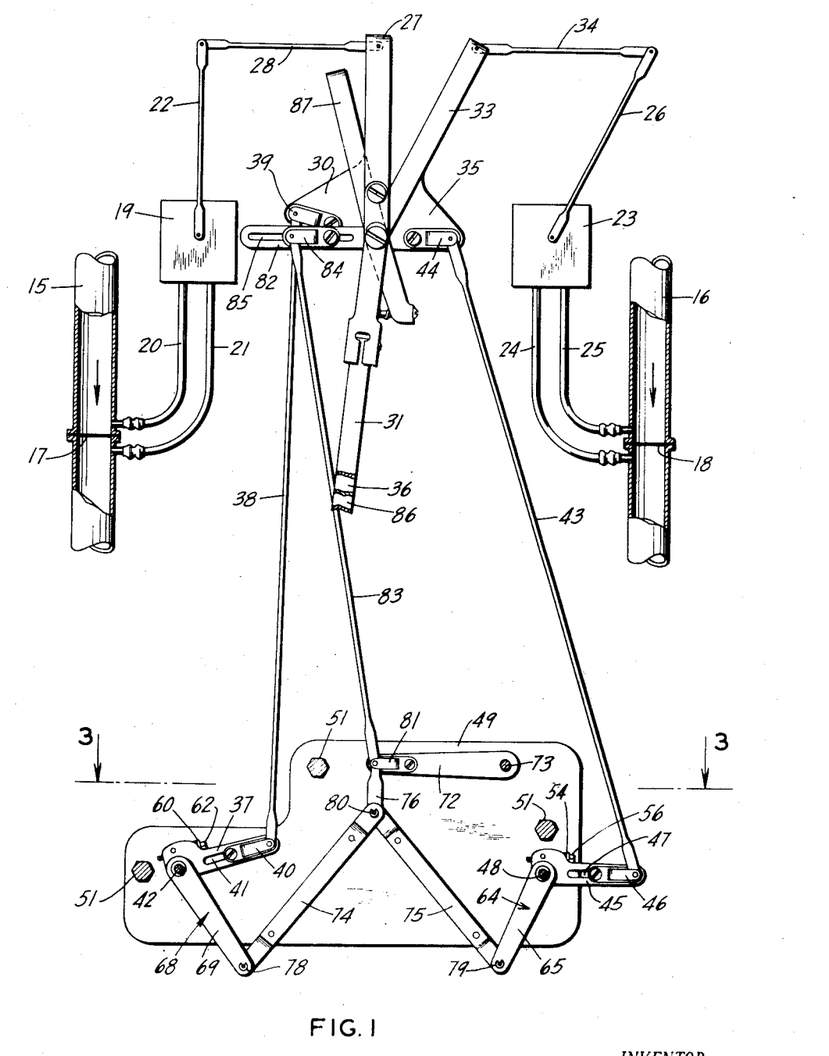
Figure 1 is a front elevational view partly schematic and partly in section, illustrating a preferred embodiment of my invention and a typical use to which it may be put.

A preferred embodiment of my invention is shown in Figure 1 as adapted to totalize two variable factors as exemplified by two fluids flowing through the conduits 15 and 16, respectively. Conventionally, fluid flows are measured by mechanically or electrically extracting the square root of the pressure drop across a primary element interposed in the fluid flow, as for example, the thin plate orifices 17 and 18. In the specific embodiment illustrated, the pressure differential across the orifice 17 is transmitted through the pressure taps and connections 20 and 21 to the measuring element 19, which deflects suitable mechanism, as for example the crank 22 either proportional to the rate of flow through the conduit 15 or proportional to a function thereof. Similarly, the pressure differential across the orifice 18 is transmitted through the pressure taps and connections 24, 25 to the measuring element 23, where it is transformed into a suitable displacement which is exhibited by the crank 26.

Figures 2, 3, 4, 7:
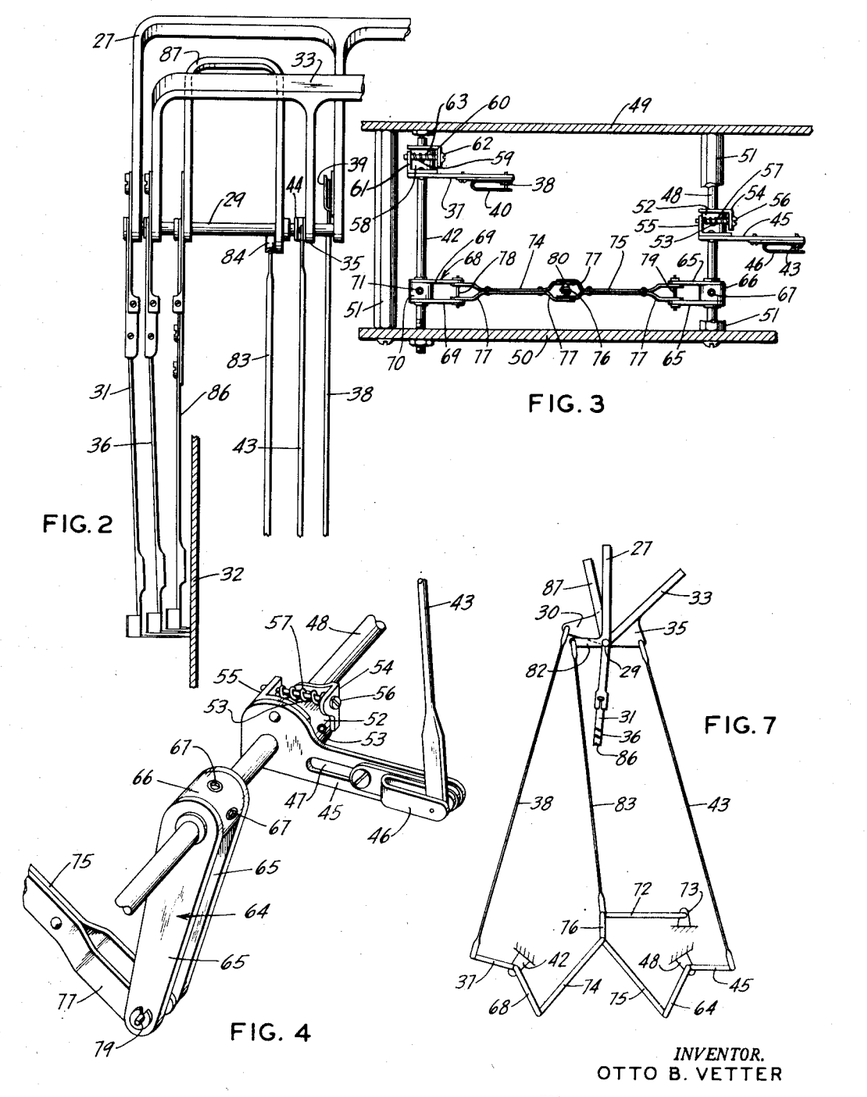
Figure 2 is a fragmentary side elevational view of the embodiment shown in Figure 1.
Figure 3 is a plan view taken in section along the line 3—3 of Figure 1.
Figure 4 is a fragmentary perspective view of a detail of the embodiment in Figures 1 through 3.
Figure 7 illustrates a modification of the embodiment of Figure 1.

Referring now to Figures 1 and 2, the crank 22 positions the yoke 27 through the connecting link 28. The yoke 27 in turn pivots about the axle 29 and drives the arm 30, simultaneously positioning a first pen 31 which records the magnitude of the instantaneous flow through the conduit 15 in suitable flow units on a recording chart 32. It further follows that the aggregate flow may be recorded by transmitting the angular deflection of the yoke 27, through suitable mechanism (not shown), to an integrator mechanism (also not shown). Also pivoted about the axle 29 is the yoke 33, which follows the motion of the crank 26 through the connecting link 34, and which positions the arm 35 and a second pen 36. The pen 36 records on the chart 32 in suitable flow units the magnitude of the instantaneous flow through the conduit 16. If desired, the aggregate flow through the conduit 16 may also be obtained, in the manner indicated above.

As the arm 30 deflects, this motion is transmitted to a follower 37 through the connecting rod 38, which is pivoted to the arm 30 at the pivot assembly 39, and which drives the follower 37 through a similar pivot assembly 40. The follower 37 pivots about the shaft 42 and is further characterized by the provision of an adjustment slot 41 along the lever arm thereof. In like manner, the connecting rod 43 is driven by the arm 35 through the pivot assembly 44, and in turn drives the follower 45 through the pivot assembly 46 adjustable along the adjustment slot 47. The follower 45 pivots about the shaft 48 which, like the shaft 42, is journalled between the plates 49 and 50. Proper spacing of the plates 49 and 50 is provided by a plurality of spacers 51, 51, 51.

As best shown in Figure 4, a collar 52 is secured to the shaft 48 by a plurality of set screws 53 and carries a bracket member 54 rigidly secured thereto. Whereas the collar 52 is secured to the shaft 48, the follower 45 and the bracket member 55 are rotatably mounted thereon, so that the relative angularity between the collar 52 and the follower 45 may be adjusted by means of the adjustment screw 56. A compression spring 57 concentric with the screw 56 maintains the connection under tension, thereby eliminating slack. Thus it will be seen that for any setting of the adjustment screw 56 that the shaft 48 deflects angularly an amount equal to the deflection of the follower 45. As shown in Figure 3, the angularity between the shaft 42 and the follower 37 may be adjusted through a similar arrangement, viz., a collar 58, a set screw 59, bracket members 60 and 61, adjusting screw 62 and a compression spring 63.

Referring again to Figure 4, a crank 64 having a pair of arms 65, 65, and a hub portion 66 is secured to the shaft 48 by set screws 67. It therefore follows that the crank 64 and the follower 45 comprise in effect a bell crank pivoted about the shaft 48, and that the angularity between the crank 64 and the follower 45 may be adjusted by means of the adjustment screw 56. In similar fashion, a crank 68 having a pair of spaced arms 69 extending from a hub portion 70 is secured to the shaft 42 by set screws 71, as shown in Figure 3. Since the followers 37 and 45 follow the motion imparted to the yokes 27 and 33 by the cranks 22 and 26, respectively, it is apparent that the cranks 64 and 68 must likewise follow this motion. These motions are in turn imparted to the crank 72, which pivots about the shaft 73. Specifically, this transmission is obtained by means of the interconnected rocker arms 74 and 75 and follower 76. The rocker arms 74 and 75 are provided with clevis-shaped ends 77, and are pivotably connected to the cranks 64 and 68 by means of the crank pins 78 and 79, respectively. The rocker arms 74 and 75 are in turn pivotably joined to the follower 76 by the pivot pin 80, the follower 76 driving the crank 72 through the pivot assembly 81.

As the crank 72 displaces due to movement of the interconnected rocker arms 74 and 75 and the follower 76, a corresponding displacement is imparted to the lever 82 through the drive link 83. The effective lever arm of the lever 82 may be adjusted by moving the pivot assembly 84 along the slot 85, so that the proportionality between movement of the crank 72 and the lever 82 may be regulated. As the lever 82 deflects about the axle 29, an identical angular deflection is imparted to a third pen 86 through the yoke 87, which deflection is recorded on the chart 32. It is also apparent that the motion of the lever 82 can be used to drive appropriate integrating mechanism (not shown).

Figure 5:
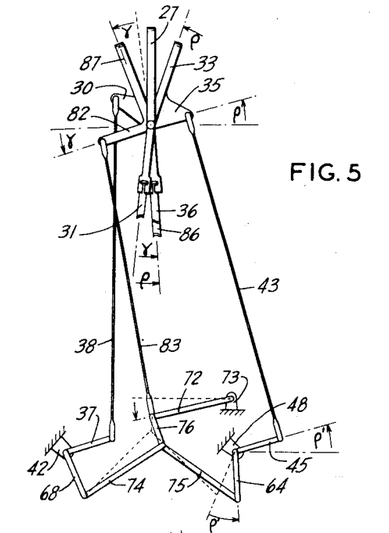
Figures 5 and 6 illustrate the operating characteristics of the embodiment shown in Figures 1 through 4.
Figure 6:
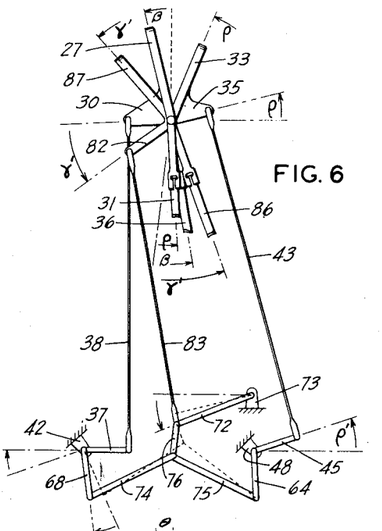

Referring now to Figures 5 and 6, which illustrate the foregoing apparatus reduced to a kinematic layout, as the arm 35 deflects from its zero position through an angle $\rho$ with an increase in the flow through conduit 16, the follower 45 deflects through an angle $\rho'$ which is proportional to the angle $\rho$. Since the follower 45 and the crank 64 act as a bell crank, the crank 64 also deflects through the angle $\rho'$. In Figure 5, the arm 30 is shown as being in its zero position; therefore, the crank 68 becomes in effect a fixed link, with the pin 78 acting as a fixed center. As a consequence, the rocker arm 74 undergoes only rotational movement, while the rocker arm 75 and the follower 76 undergo both rotational and translational movements, the net effect being that the crank 72 deflects through an angle which is proportional to both the angles $\rho$ and $\rho'$. Deflection of the crank 72 similarly deflects the lever 82, which displaces through an angle γ. Since the lever 82 and the arm 35 are drivably connected through the yokes 87 and 33 to the pens 86 and 36, respectively, these pens also displace through the angles γ and ρ, respectively. Therefore, since the angle γ is proportional to the angle ρ, through proper proportioning of the various elements referred to and by employing the same units on the chart 32, the pens 86 and 36 deflect equally. If desired, however, my invention may be adjusted so that the pen 86 deflects through a greater or smaller angle than the pen 36. Under this latter condition, however, it becomes necessary to employ different chart scales for the pens 86 and 36.

As the flow through the conduit 15 increases from the zero condition, the arm 30 displaces in accordance therewith through the angle β. This displacement is in turn followed by the follower 37 and the crank 68, which displace through an angle β' proportional to the angle β. Assuming for the moment that the flow through the conduit 16 is steady, the crank 64 acts as a fixed link about which the rocker arms 74 and 75 displace, as a consequence of which the crank 72 is displaced counterclockwise yet further from its zero position. This additional angular displacement of the crank 72 is proportional to the angles β and β', provided the crank 64 is treated as a fixed link. As the crank 72 displaces additionally, the lever 82 also deflects proportionately, so that it assumes a new angular displacement γ'. It follows that the pen 86 likewise is displaced from its zero position through the angle γ'.

Thus, when either one of the arms 30 or 35 moves to a new position, the pen 86 is similarly repositioned so that when the lever arms of the followers 37 and 45 are of equal length, the relation between the deflection of the pens 31, 36 and 86 may be expressed as $\gamma' \propto \rho + \beta$. Moreover, I have found that when the linkage of Figure 1 is operated within the normal instrumentation range, and proportioned such that the deflections of the followers 37 and 45 do not exceed a 30° travel, that the deflection of the third pen 86 follows the foregoing expression within extremely close limits of accuracy.

Advantageously, my invention achieves this high degree of accuracy notwithstanding the fact that in the strictest sense neither of the cranks 64 and 68 can be regarded as an absolutely fixed link with respect to the other, as motion is imparted to that other. In the actual case, however, the inertia of the mechanism driving each of the cranks 64 and 68 is so very much greater than that of the mechanism positioned by the crank 72, that substantially all of the motion imparted to each of the followers 37 and 45 is translated into motion at the pen 86. Actual tests have demonstrated, moreover, that the error present in the reading of the pen 86 as a consequence of this effect is well within the limits of error which are introduced into the system due to inaccuracies inherent in measuring elements. Consequently, the operation of my invention may be satisfactorily explained using the theory prescribed above in conjunction with Figures 5 and 6.

To calibrate and set the foregoing mechanism at the desired null or zero position, and also to vary the maximum deflection of the third pen 86 with respect to the deflections through which the pens 31 and 36 move, I provide a plurality of novel adjustments. Thus, by changing the angularity between the followers 37 and 45 and the cranks 64 and 68, respectively, by means of the corresponding adjusting screws 56 and 62, the relative angularity may be changed between the rocker arms 74 and 75, and the mechanism depending therefrom and driven thereby. This, then, affords a means for moving the lever 82 relative to the arms 30 and 35. By the same token, movement of the pivot assembly 84 along the lever 82 only increases or decreases the chart range through which the third pen 86 deflects and does not in any way change the summation characteristics of this pen movement, with respect to the deflection exhibited by the pens 31 and 36. Where it becomes desirable to change the angularity between the followers 37 and 45 and the cranks 64 and 68 an amount greater than that within the adjustment limits of the screws 56 and 62, respectively, this may be achieved by backing off the set screw 67 (or 71) and moving the collar 66 (or 70) relative to the shaft 48 (or 42). Ordinarily, however, it is not necessary to resort to this latter adjustment feature for the purposes indicated.

Whereas thus far, I have explained the applicability of my invention to the problem of adding two variable factors together, it is equally as applicable to the subtraction of two variable factors. Figure 7 illustrates one manner in which my invention may be converted to this latter purpose. More specifically, Figure 7 shows the follower 37 to be approximately 180° displaced from that shown in the preceding figures; consequently, as the crank 22 displaces in a counterclockwise direction under the impetus of a change in flow in the conduit 15, the crank 68 also moves counterclockwise, and not clockwise, as was the case before.

One manner in which this repositioning of the follower 37 may be attained is to release the rod 38 from the pivot assembly 40, back off the set screws 59, and turn the collar 58 until the follower 37 is in the new position, whereupon the set screws are reset and the rod 38 is connected again to the pivot assembly 40.

Figure 8:
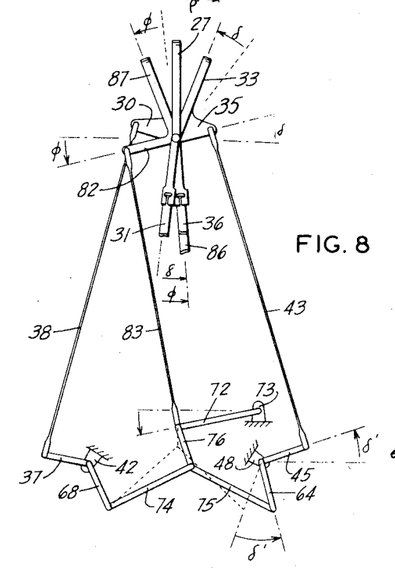
Figures 8 and 9 illustrate the operating characteristics of the modification shown in Figure 7.
Figure 9:
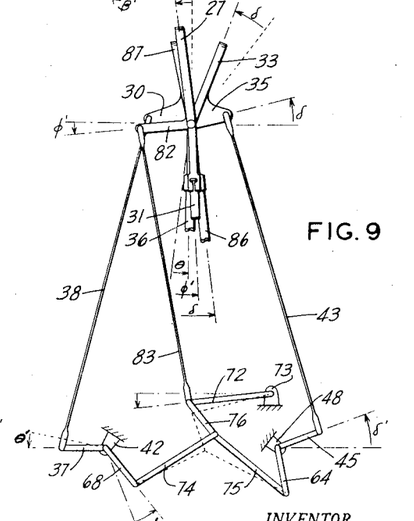

The way in which the various elements comprising my invention cooperate when the follower 37 is adjusted to this new position may best be discerned by referring to the kinematic layouts of Figures 8 and 9. As the yoke 33 displaces counterclockwise, the arm 35 deflects through an angle δ, while the follower 45 and crank 64 deflect through an angle δ' proportional to the angle δ. Consequently, treating the crank 68 as a fixed link, the third pen 86 deflects through an angle φ which is proportional to the angle δ. By proper adjustment of the related parts, the pen 86 will deflect through the same angle as the pen 31. Referring now to Figure 9, as the yoke 27 displaces through an angle θ, the follower 37 deflects in opposite direction than was the case in Figure 6, this angular deflection of the follower 37 being designated θ'. Accordingly, while the pen 31 deflects in proportion to the angle θ, the pen 86 moves toward the null position, the new deflection of said pen, designated φ', being equal to the difference between the angle δ and the angle θ.

Figure 10:
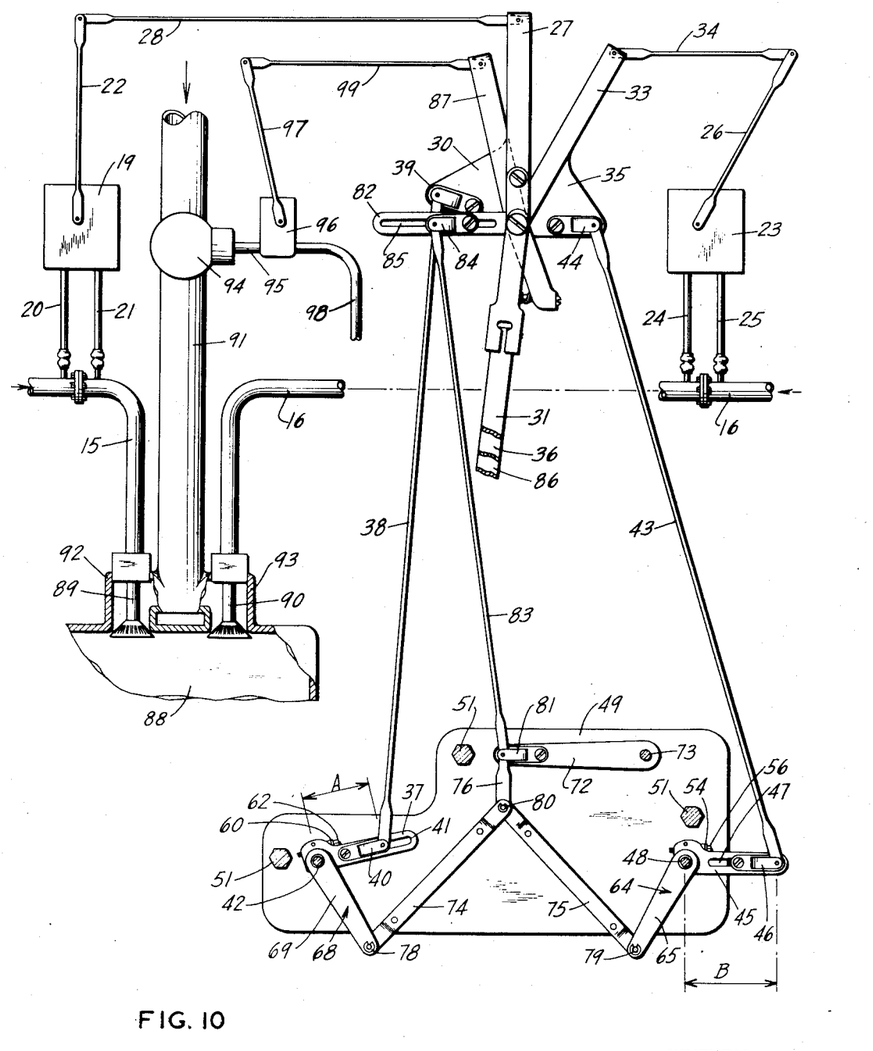
Figure 10 is a front elevational view, partly in section and partly schematic, illustrating the manner in which my invention may be adapted to the control of a combustion process.

By way of further establishing the utility of my invention, Figure 10 illustrates one manner in which the totalizing mechanism may be used for control purposes. Stated broadly, this modification comprise coupling the yoke 87 to a suitable control system for the purpose of controlling the amount of air flowing to a furnace 88 into which two fuels are being introduced through the burners 89 and 90 respectively. A main air duct 91 terminating in two branch ducts 92 and 93 supplies the air necessary to support combustion. A pneumatically operated valve 94 is inserted in the duct 91 upstream of the ducts 92 and 93 and is operatively connected to the control unit 96 through the tubing 95. As the angular position of the crank 97 is changed, the unit 96 throttles the constant air supply flowing thereto through the tubing 98 to a value proportional to the deflection of the crank 97, and transmits this new control pressure to the valve 94.

Advantageously, since the crank 97 is operatively connected to the yoke 87 through the link 99, any displacement of the yoke 87 is telemetered to the valve 94 and positions it accordingly. Since the totalizing mechanism may be set such that the deflection of the yoke 87 is proportional to the sum of the flows through the conduits 15 and 16, as explained above, movement of the yoke 87 therefore effectively controls the air supply to the burners 89 and 90 in the proportions required for optimum combustion. Thus, my invention provides novel control means whereby a constant air-fuel ratio must be maintained.

My invention is also applicable to the control of the air flowing to the furnace proper 88 even in the case where the two fuels supplied to the burners 89 and 90 have different air-fuel ratios. Thus, if the gas flowing through conduit 15 has an air-fuel ratio of A, while the gas flowing through the conduit 16 has an air-fuel ratio of B, these ratios will be maintained by setting the lengths of the effective lever arms of the followers 37 and 45 proportional to A and B in the manner shown in Figure 10. This setting may be readily obtained by adjusting the pivot assemblies 40 and 46 along the slots 41 and 47, respectively. It will thus be apparent that for the same angular deflection of the arms 30 and 35, which corresponds to equal increments of flow in the usual case, that the crank 68 will deflect A/B times as much as the crank 64. Consequently, variations in the magnitude of flow through the conduit 15 affect the position of the crank 72, and hence eventually the valve 94, only A/B as much as similar variations in the flow through the conduit 16.

To indicate the manner in which this novel arrangement makes possible the accurate control of combustion conditions where two different fuels having different air-fuel ratios are being used, reference is had to the following hypothetical example. Assume that A=6 and B=10, that the maximum flow of each gas through the conduits 15 and 16 is 100 c. f. m., and that the arms 30 and 35 deflect equally at that value. Consequently, the total amount of air required for this maximum flow is equal to (6×100)+(10×100)=1600 c. f. m. When this condition prevails, the deflection of yoke 87, which sets the control valve 94 to yield this maximum air flow, is composed of a first deflection proportional to the deflection of the arm 35 and a second deflection proportional to ($\frac{6}{10}$=) 0.6 of the deflection of the arm 30. Now, if the flow through the conduit 15 remains constant, while the flow through the conduit 16 drops to one-half of its maximum value, then obviously the total air flow should be (6×100)+½(10×100)=1100 c. f. m. That the control valve 94 will in fact supply this demand is at once apparent. More specifically, the deflection of the yoke 87 under these conditions is equal to $$\frac{6+\tfrac{1}{2}\times 10}{6+10}=\tfrac{11}{16}$$

of the maximum deflection. Since the maximum flow is 1600 c. f. m., $\tfrac{11}{16}$ of this value is ($\tfrac{11}{16}\times 1600=$)1100 c. f. m., which value checks with that indicated above.

On the other hand, if the flow through the conduit 15 is reduced to one-third of its maximum value, while the flow through the conduit 16 is equal to three-quarters of its maximum value, then the total air flow required to satisfy the requirements of combustion should be ⅓(6×100)+¾(10×100)=950 c. f. m. Under these conditions, the actual deflection of the yoke 87 is equal to $$\frac{\tfrac{1}{3}\times 6+\tfrac{3}{4}\times 10}{6+10}=\frac{9.5}{16}$$

times the maximum deflection. Again, it follows that the deflection of the yoke 87 correctly positions the control valve 94 to give an air flow equal to $$\left(\frac{9.5}{16}\times 1600\right)=950 \text{ c. f. m.}$$

The foregoing specific examples demonstrate, therefore, that the flow of air through the duct 91 will always be at that value required for optimum combustion provided that the lengths of the effective lever arms of the followers 37 and 45 correspond to the air-fuel ratios of the fuels being used. Advantageously, the arrangement of Figure 10 insures that the correct amount of air will flow through each of the ducts 92 and 93 to the burners 89 and 92, even where the quantities required to support combustion are widely divergent in magnitude. This condition obtains from the fact that through aspiration phenomena, the air flowing into the two ducts 92 and 93 automatically divides itself in the proper proportion.

While I have shown that my invention is adapted to the specific problem of controlling air to combustion processes involving two gas flows having the same or different air-fuel ratios, it logically follows that it can also be used to totalize two variable factors in any desired proportion therebetween as for example adding one-half of the value of one flow to the full value of another flow, and exhibit and/or record the same.

Figure 11:
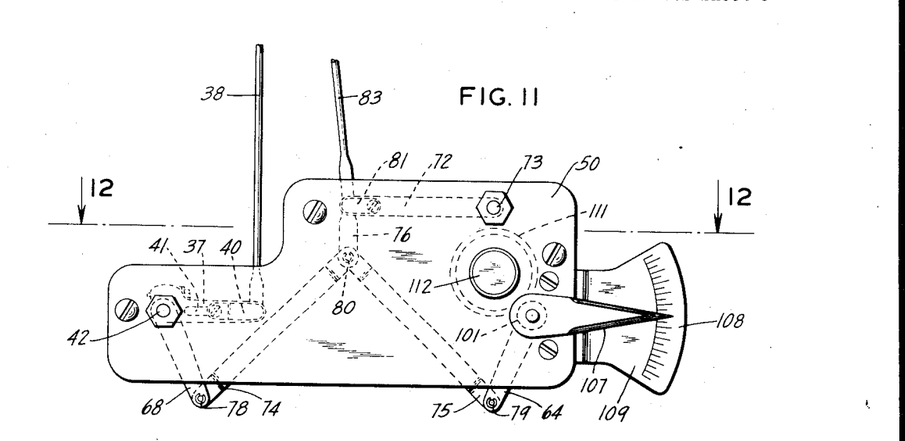
Figure 11 is a front elevational view of a further embodiment of my invention.

A further embodiment of my invention, shown in Figure 11, provides means whereby a constant corrective factor may be added to or subtracted from a variable factor as for example correcting gauge pressure for certain substantially constant barometric conditions. The specific embodiment illustrated includes a shaft 100 which is trunnioned by the plates 49 and 50 and which extends through the latter. A small pinion 101 is secured to the shaft 100, and is drivably connected to the collar 102. A bracket member 103 is secured to the collar 102 and is adjustably interconnected with a bracket member 104 by means of an adjusting screw 105. A helical compression spring 106 maintains the connection between the members 103 and 104 under tension, thereby eliminating slack. Secured to the bracket member 104 is a pointer 107, the relative angular deflection of which may be measured by the scale 108 on the bracket 109. A shaft 110 parallel to the shaft 100 carries a large pinion 111, which is positioned by means of the knob 112, and which is drivably engaged with the pinion 101.

Upon turning the knob 112, the pinion 111 drives the pinion 101 and thereby repositions the shaft 100. The shaft 100 also carries the crank 65, so that by changing the angular position thereof a corresponding increment is added to or subtracted from the deflection imparted to the crank 72 by the crank 64. The magnitude of this angular displacement of the shaft 100 and the crank 64, and hence the magnitude of the corrective factor, is shown by the position of the pointer 107 with respect to the scale 108. For convenience, the scale 108 may be graduated to read directly in the units of the factor being corrected for, as for example degrees of temperature. Advantageously, the pointer 107 may be adjusted relative to the scale 108 by means of the adjusting screw 105, thereby providing a means of adjusting the pointer 107 relative to a reference condition. A courser adjustment which may be used either alternatively or in combination with the foregoing adjustment comprises backing off the set screws 67 and repositioning the crank 64 relative to the shaft 100.

Figure 12:
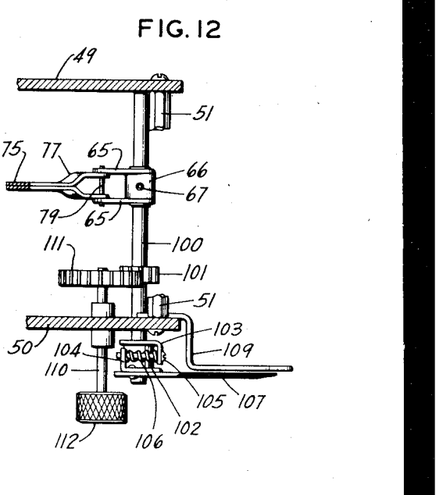
Figure 12 is a plan view taken in section along the line 12—12 of Figure 11.

While the embodiment shown in Figures 11 and 12 utilizes the same basic principles of operation as does the embodiment of Figure 1, so that the deflection of the crank 72 is a measure of the deflections of the follower 37 and the crank 64, it has the special advantage of making it unnecessary to couple an indicating-type measuring element to the crank 64 where the factor to be compensated for is substantially constant. Again, in some instances, it proves impractical or excessively costly to record some variable factors on a continuous basis, such as for example moisture correction of a gas flow. Obviously, the movement of the crank 72 may be either recorded in the manner shown in Figure 1, or else transmitted to suitable control apparatus in the manner indicated in Figure 10.

Figure 13:
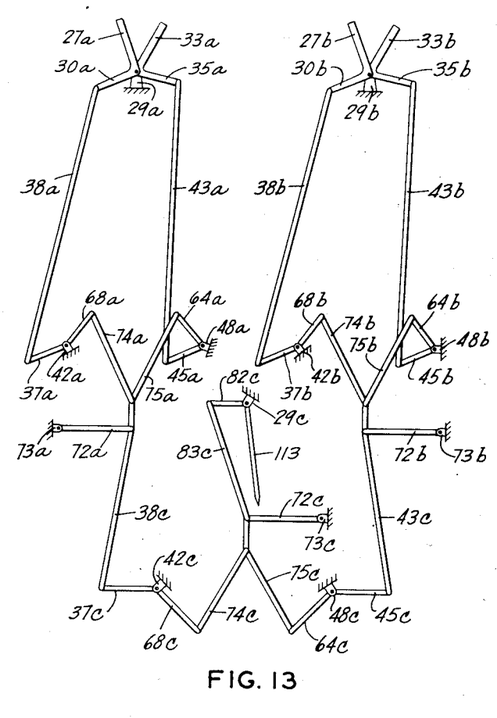
Figure 13 illustrates another modification of my invention whereby four or more variables may be totalized.

While thus far my invention has been disclosed in conjunction with the totalization of two factors at least one of which has been variable, it is equally as applicable to the totalization of three or more independent measurements. Thus, for example, by using the arrangement shown schematically in Figure 13, my invention may be employed to add four separate measurements together. Advantageously, the mechanism of Figure 13 may be resolved, for purposes of analysis, into three interconnected linkages each functionally similar to that shown in Figures 5 and 6, the corresponding parts being designated by the letters a, b and c. Thus, upon a consideration of the foregoing discussion in conjunction with Figures 5 and 6, it is apparent that the sum of the deflections imparted to the yokes 27a and 33a (Figure 13) is reflected by the displacement of the crank 72a. Similarly, the sum of the deflections imparted to the yokes 27b and 33b is reflected by the deflection of the crank 72b. The motions of the cranks 72a and 72b in turn are imparted to the followers 37c and 45c of yet another totalizing mechanism. The resultant deflection of these two motions reflects the sum of all of the motions imparted to the yokes 27a, 27b, 33a and 33b, and is exhibited by the indicator 113. Similarly, three separate variable measurements may be totalized by deleting the mechanism driving the crank 72b and merely positioning the crank 72b in accordance with the magnitude of one measurement, the other two measurements being totalized by the mechanism driving the crank 72a in the manner explained above. The resultant deflection of the indicator 113 under these conditions would then be proportional to the total of the three measurements.

I have shown therefore that my invention is applicable to such useful purposes as the addition and subtraction of two or more measurements; the compensation of a variable factor for a constant corrective factor; and the control of industrial processes and the like. It is also apparent that preferred embodiments of my invention incorporate novel adjusting means therewith which greatly enlarge their utility and simplify the calibration thereof. Above all, my invention is inherently accurate in operation, and because of its simple and rugged nature provides this high degree of accuracy over long periods of usage.

While I have shown and described certain embodiments of my invention, it is to be understood that these embodiments have been given by way of example only and that various changes and rearrangements of the details shown herein may be made without departing from the spirit of the invention, the scope of which is defined in the appended claims.

I claim:

1. In a measuring system which operates at or about a reference position, mechanism adapted to summate two measurements, which comprises: a first pivot and a first crank turning thereon, a first crank pin on said first crank; means for positioning said first crank in accordance with the magnitude of one of said measurements; a second pivot spaced from said first pivot and a second crank turning thereon, a second crank pin on said second crank having an effective lever arm substantially equal to that of said first crank pin, other means for positioning said second crank in accordance with the magnitude of the other of said measurements; a pair of connecting rods of substantially equal length, a pivot pin pivotally connecting one end of one connecting rod to one end of the other connecting rod; the other ends of said rods each being coupled to a different one of said crank pins; a member movable along a path any point of which is substantially equidistant from said pivots; means constraining said member to said path; and means interconnecting said member with said pair of connecting rods at said pivot pin.

2. In a measuring apparatus, summation mechanism comprising a first pivot and a first crank rotatable thereon, a first arm rotatable on said first pivot, means for adjusting the angularity between said first crank and said first arm, a second pivot and a second crank rotatable thereon, a second arm rotatable on said second crank, means for adjusting the angularity between said second crank and said second arm, first pivot means on said first crank, second pivot means on said second crank having an effective lever arm substantially the same length as the lever arm of said first pivot means, a third pivot and a third crank thereon, third pivot means on said third crank spaced from said third pivot a distance such that when said third crank is parallel to a line between said first and second pivots, said third pivot means is substantially equidistant from said first and second pivots, a rocker arm one end of which is connected to said third pivot means, a first and a second connecting rod of substantially equal length, one end of said first rod connected to said first pivot means, one end of said second rod connected to said second pivot means, and means pivotably connecting together the other ends of said rocker arm and said connecting rods.

3. Mechanism of the character described, comprising a first pivot and a first crank rotatable thereon, a second pivot and a second crank rotatable thereon, first pivot means on said first crank, second pivot means on said second crank having an effective lever arm substantially the same length as the lever arm of said first pivot means, a third, fixed pivot and a third crank thereon, third pivot means on said third crank spaced from said third pivot a distance such that when said third crank is parallel to a line between said first and second pivots, said third pivot means is substantially equidistant from said first and second pivots, a rocker arm one end of which is connected to said third pivot means, a first and a second connecting rod of substantially equal length, one end of said first rod connected to said first pivot means, one end of said second rod connected to said second pivot means, and means pivotably connecting together the other ends of said rocker arm and said connecting rods.

4. In a measuring system, mechanism adapted to totalize a first and a second variable in a ratio other than 1:1, which comprises: a first member deflectable in accordance with the magnitude of one of said variables, a first pivot and a first crank rotatable thereon, means connecting said first member and said first crank, means for adjusting said first-mentioned means to vary the deflection of said first crank for a given deflection of said first member, a second pivot and a second crank rotatable thereon, means deflecting said second crank in accordance with the magnitude of the other of said variable, a pair of links of substantially equal length, pivot means connecting together said links, means pivotably connecting said links to said cranks at substantially equal distances from said pivots, respectively, a second member movable along a path any point of which is substantially equidistant from said pivots, means constraining said second member to said path, and a third link interconnecting said second member with said pair of links at said pivot means.

5. In a measuring system, mechanism for totalizing two variables, which comprises: a first pivot and a first member turning thereon in accordance with the magnitude of one of said variables, a second pivot and a second member turning thereon in accordance with the magnitude of the other of said variables, a pair of links of substantially equal length, pivot means connecting together said links, means pivotably connecting said links to said members at substantially equal distances from said pivots, respectively, a third member movable along a path any point of which is substantially equidistant from said pivots, means constraining said third member to said path, and a third link interconnecting said third member with said pair of links at said pivot means.

6. In a measuring system, mechanism for totalizing two measurements, which comprises: a first pivot and a first member turning thereon in accordance with the magnitude of one of said measurements, a second pivot and a second member turning thereon in accordance with the magnitude of the other of said measurements, a pair of links, pivot means connecting together said links, means pivotably connecting said links to said members, respectively, a third member movable along a path any point of which is substantially equidistant from said pivots, means constraining said third member to said path, and a third link interconnecting said third member with said pair of links at said pivot means.

7. In a measuring system, means for superposing a corrective factor of constant magnitude upon a variable factor, comprising: a first shaft and a first crank turnable thereon, means deflecting said first crank in accordance with the magnitude of said variable factor, a second shaft and a second crank turnable therewith, means for adjustably turning said second shaft, an indicator operatively connected to said second shaft, scale means for determining the relative deflection of said indicator, a first link and a second link of substantially equal length, means pivotably connecting one end of said first link to said first crank, means pivotably connecting one end of said second link to said second crank, the effective lever arms of the pivotable connections between said links and said pivots, respectively, being substantially equal, a third pivot and a third crank rotatable thereon, first pivot means spaced on said third crank such that when said third crank is parallel to a line between said first and second pivots, said pivot means is substantially equidistant from said first and second pivots, a third link connected at one end thereof to said pivot means on said third crank, and second pivot means connecting together the other ends of said first, second and third links.

8. In a measuring system, means for superposing a corrective factor of constant magnitude upon a variable factor, comprising: a first pivot and a first member turning thereon in accordance with the magnitude of said variable factor, a second pivot and a second member thereon, means indicating the relative angular position of said second member, means for adjusting the angular position of said second member to correspond with the magnitude of said corrective factor, a pair of links, pivot means connecting together said links, means pivotably connecting said links to said members, respectively, a third member movable along a path any point of which is substantially equidistant from said pivots, means constraining said third member to said path, and a third link interconnecting said third member with said pair of links at said pivot means.

OTTO B. VETTER.

REFERENCES CITED

The following references are of record in the file of this patent:

UNITED STATES PATENTS

| Number | Name | Date |
| --- | --- | --- |
| 1,620,240 | Smoot | Mar. 8, 1927 |
| 1,701,500 | Keith | Feb. 12, 1929 |
| 2,045,621 | Spitzglass et al. | June 30, 1936 |
| 2,093,254 | Spitzglass et al. | Sept. 14, 1937 |
| 2,179,822 | Imm | Nov. 14, 1939 |
| 2,345,520 | Zieboltz | Mar. 28, 1944 |
| 2,448,596 | Imm | Sept. 7, 1948 |

FOREIGN PATENTS

| Number | Country | Date |
| --- | --- | --- |
| 144,893 | Switzerland | of 1931 |